(12) United States Patent
Kisch et al.

(10) Patent No.: US 10,040,274 B2
(45) Date of Patent: Aug. 7, 2018

(54) PRE-FILLED RADIUS LAYUPS

(71) Applicant: The Boeing Company, Chicago, IL (US)

(72) Inventors: Robert Arthur Kisch, Auburn, WA (US); Kyle Jeffries, Everett, WA (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 14/306,994

(22) Filed: Jun. 17, 2014

(65) Prior Publication Data
US 2015/0360440 A1 Dec. 17, 2015

(51) Int. Cl.
| | |
|---|---|
| *B32B 37/00* | (2006.01) |
| *B32B 37/14* | (2006.01) |
| *B29C 70/38* | (2006.01) |
| *B32B 5/00* | (2006.01) |
| *B32B 5/02* | (2006.01) |
| *B32B 5/22* | (2006.01) |
| *B32B 7/00* | (2006.01) |
| *B32B 7/04* | (2006.01) |
| *B32B 27/00* | (2006.01) |
| *B32B 27/20* | (2006.01) |
| *B32B 1/00* | (2006.01) |
| *B32B 1/06* | (2006.01) |

(Continued)

(52) U.S. Cl.
CPC .......... *B32B 37/142* (2013.01); *B29C 70/382* (2013.01); *B29C 70/745* (2013.01); *B32B 1/00* (2013.01); *B32B 1/06* (2013.01); *B32B 3/00* (2013.01); *B32B 3/02* (2013.01); *B32B 3/04* (2013.01); *B32B 3/06* (2013.01); *B32B 3/08* (2013.01); *B32B 3/18* (2013.01); *B32B 3/20* (2013.01); *B32B 3/26* (2013.01); *B32B 3/28* (2013.01); *B32B 5/00* (2013.01); *B32B 5/02* (2013.01); *B32B 5/22* (2013.01); *B32B 7/00* (2013.01); *B32B 7/04* (2013.01); *B32B 27/00* (2013.01); *B32B 27/20* (2013.01); *B29K 2105/0872* (2013.01); *B29L 2031/3076* (2013.01); *B32B 2250/00* (2013.01); *B32B 2264/00* (2013.01); *B32B 2307/558* (2013.01); *B32B 2307/7242* (2013.01); *B32B 2307/7265* (2013.01); *B32B 2605/00* (2013.01); *B32B 2605/003* (2013.01); *B32B 2605/18* (2013.01); *Y10T 156/1028* (2015.01); *Y10T 428/24752* (2015.01)

(58) Field of Classification Search
CPC ..... B29C 70/38; B29C 70/382; B29C 70/384; B29C 70/386; B29C 70/388; B29C 70/845; B32B 37/142; B29D 99/0003; B29D 99/0014; B32C 38/1808; Y10T 156/1028
See application file for complete search history.

(56) References Cited

U.S. PATENT DOCUMENTS 4,331,723 A * 5/1982 Hamm ................. B29C 70/865
156/293
4,789,594 A 12/1988 Stawski
(Continued)

FOREIGN PATENT DOCUMENTS

CA 2829519 A1 * 5/2014 ............. B29C 70/32

*Primary Examiner* — John L Goff, II
(74) *Attorney, Agent, or Firm* — Yee & Associates, P.C.

(57) ABSTRACT

A void between two or more composite laminate parts is filled by a composite laminate filler that is laid up and integral with at least one of the parts.

20 Claims, 8 Drawing Sheets

(51) Int. Cl.

| | | |
|---|---|---|
| *B32B 3/00* | (2006.01) | |
| *B32B 3/02* | (2006.01) | |
| *B32B 3/04* | (2006.01) | |
| *B32B 3/06* | (2006.01) | |
| *B32B 3/08* | (2006.01) | |
| *B32B 3/18* | (2006.01) | |
| *B32B 3/20* | (2006.01) | |
| *B32B 3/26* | (2006.01) | |
| *B32B 3/28* | (2006.01) | |
| *B29C 70/74* | (2006.01) | |
| *B29L 31/30* | (2006.01) | |
| *B29K 105/08* | (2006.01) | |

(56) References Cited

U.S. PATENT DOCUMENTS

| | | | |
|---|---|---|---|
| 5,454,897 A * | 10/1995 | Vaniglia | B29C 70/32 156/166 |
| 5,639,535 A | 6/1997 | McCarville | |
| 6,231,941 B1 | 5/2001 | Cundiff et al. | |
| 6,562,436 B2 | 5/2003 | George et al. | |
| 6,689,448 B2 | 2/2004 | George et al. | |
| 6,709,538 B2 | 3/2004 | George et al. | |
| 8,540,833 B2 | 9/2013 | Deobald et al. | |
| 8,591,685 B2 | 11/2013 | Anderson et al. | |
| 2012/0316666 A1 * | 12/2012 | Boyl-Davis | G05B 19/40931 700/98 |
| 2013/0105072 A1 * | 5/2013 | Anderson | B29C 70/526 156/264 |
| 2013/0171895 A1 | 7/2013 | Wolf et al. | |
| 2014/0034236 A1 | 2/2014 | Guzman et al. | |

* cited by examiner

PRE-FILLED RADIUS LAYUPS

BACKGROUND INFORMATION

1. Field

The present disclosure generally relates to composite structural assemblies, and deals more particularly with filling voids in assembled joints.

2. Background

Composite part assemblies sometimes have joints containing voids. In order to maximize the strength and/or rigidity of the assembly, the void must be filled. For example, stiffeners such as stringers or spars may comprise two or more parts that are bonded together along radius edges that form a joint having a radiused V-shaped groove. In order to strengthen the joint, a separate, pre-formed radius filler is placed in the groove and bonded to the parts. The radius filler may comprise an adhesive or prepreg tape or fabric.

Separate fillers can be time consuming and labor intensive to fabricate and install. Fillers used in long stiffener joints may be difficult to handle and are subject to kinking, twisting, wrinkling and/or mislocation during fit-up and installation. Moreover, individually fabricated fillers may be subject to porosity problems, as well as cracking due to thermal stresses produced during thermal curing.

Accordingly, there is a need for a method of filling a void in a joint in a composite assembly that may eliminate the need for a separate filler or reduce the size of the filler required to fill the void. There is also a need for a method of filling voids in a joint that reduces porosities and cracking within a joint between composite parts.

SUMMARY

The disclosed embodiments provide a method of filling a void within a joint between two or more composite laminate parts by integrating a filler into one of the parts, thereby pre-filling the void when the parts are assembled and cured. Porosities, cracking and part count are reduced, while eliminating problems related to handling, fit up and installation of fillers. Touch labor as well as material waste is reduced. The integrated composite radius filler may be located within a void with increased precision. The integrated filler is formed by multiple composite plies which, when laid up, collectively have a cross sectional shape that substantially matches the cross sectional shape of the void.

According to one disclosed embodiment, a method is provided of filling a void between two parts of a composite laminate structure. The method comprises laying up a plurality of partial plies on at least one of the two parts, including sizing and shaping the partial plies to substantially match the void. The plies may be laid up using an automatic fiber placement machine. The method may also include laying up a plurality of full plies, and alternating the full plies and the partial plies such that the partial plies are interspersed between the full plies. The sizing and shaping includes using the partial plies to form a tapered shape substantially filling the void. The method may also include determining a size and a shape of the void, and determining a number and dimensions of partial plies required to fill the void.

According to another disclosed embodiment, a method is provided of fabricating a composite laminate structure having at least first and second parts joined together along an intersection having a void. The method includes fabricating a first one of the parts by laying up a plurality of full plies, and laying up a plurality of partial plies on the first part forming at least a first feature that substantially fills at least a first portion of the void. The partial plies may be laid up using an automatic fiber placement machine. Fabricating the first part includes forming a radius edge on the first part, and laying up the plurality of partial plies includes laying up partial plies on the radius edge. The method may further comprise fabricating a second one of the parts by laying up a plurality of full plies, including forming a radius edge on the second part, and laying up partial plies on the second part forming a second feature that substantially fills a second portion of the void. Laying up the plurality of full plies and laying up the plurality of partial plies are alternately performed to intersperse the partial plies with the full plies. The method may also include determining a size and a shape of the void, and determining the size and number of partial plies required to fill the void.

According to another disclosed embodiment, a filler is provided for filling a void between two composite laminate parts. The filler comprises a plurality of partial plies laid up on at least one of the composite laminate parts. The filler has a cross sectional shape substantially matching at least a portion of the void. The filler may also include a plurality of full plies, wherein the partial plies and the full plies are interspersed with each other. In one variation, the cross sectional shape of the plurality of partial plies is generally triangular. The partial plies may be integrally laminated with the one of the composite laminate parts.

According to still another disclosed embodiment, a composite radius filler is provided for filling a void in a composite structure having a radius edge. The filler comprises a plurality of composite plies integrally formed with the structure and collectively having a shape substantially matching the void. The shape may be generally triangular, having a base extending along the structure and an apex extending into the void. The plurality of composite plies may include a plurality of partial plies and a plurality of full plies interspersed with the partial plies.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
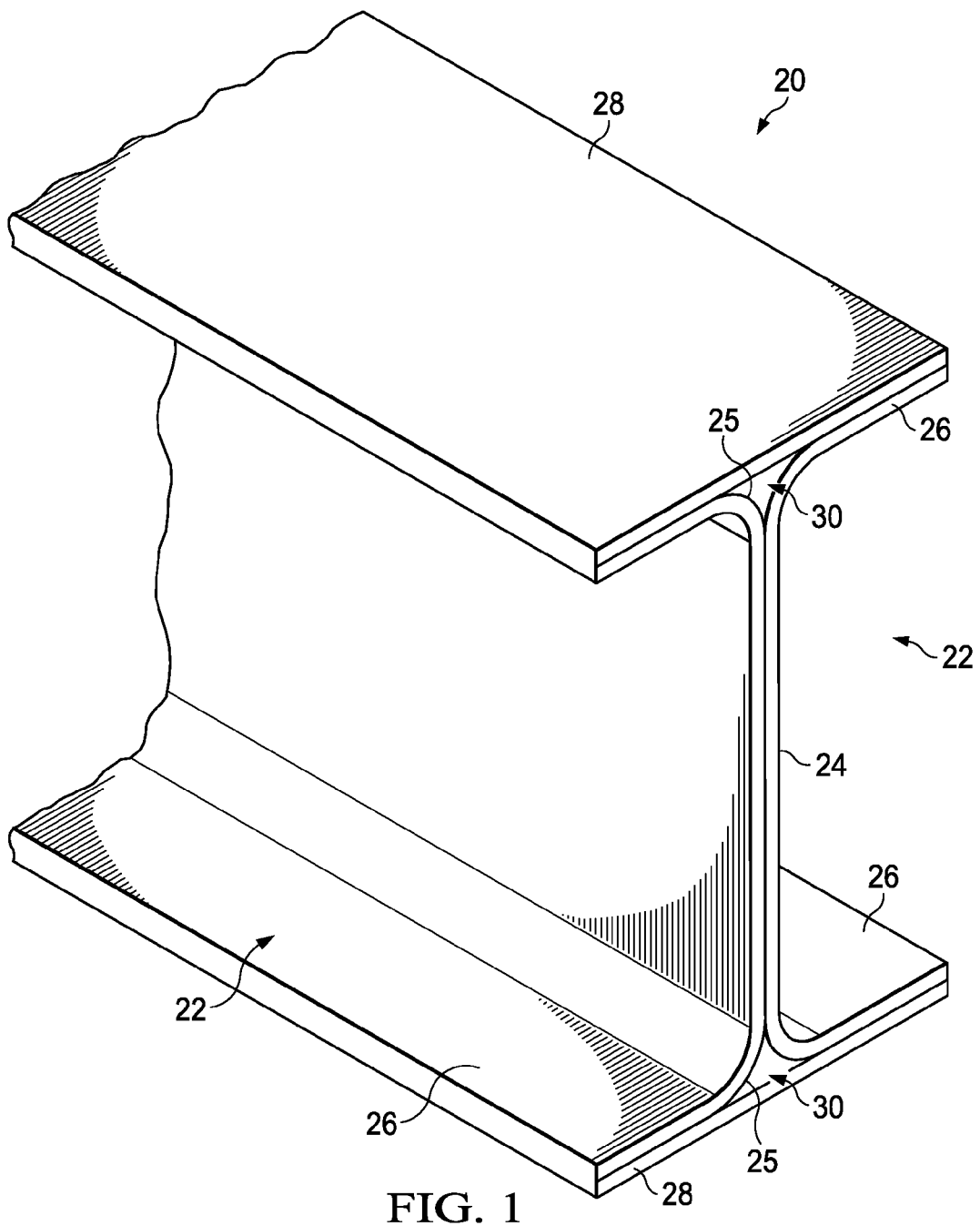
FIG. 1 is an illustration of a perspective view of a portion of a stiffener having integrated fillers.

Referring first to FIG. 1, a composite laminate structure comprises an assembly of two or more composite laminate parts which are joined together by bonding or co-curing. For example, the composite laminate structure may comprise a stiffener 20 having a generally I-shaped cross-section. The stiffener 20 comprises a pair of composite laminate C-shaped parts 22, and a pair of composite laminate caps 28. Each of the C-shaped parts 22 includes a pair of outwardly turned flanges 26 connected by a web 24 along radius edges 25. The flanges 26 are covered by caps 28. The intersection of the opposing radiused edges 25 and the caps 28 form gaps or voids 30 that may be required to be filled in order to strengthen the stiffener 20.

Figure 2:
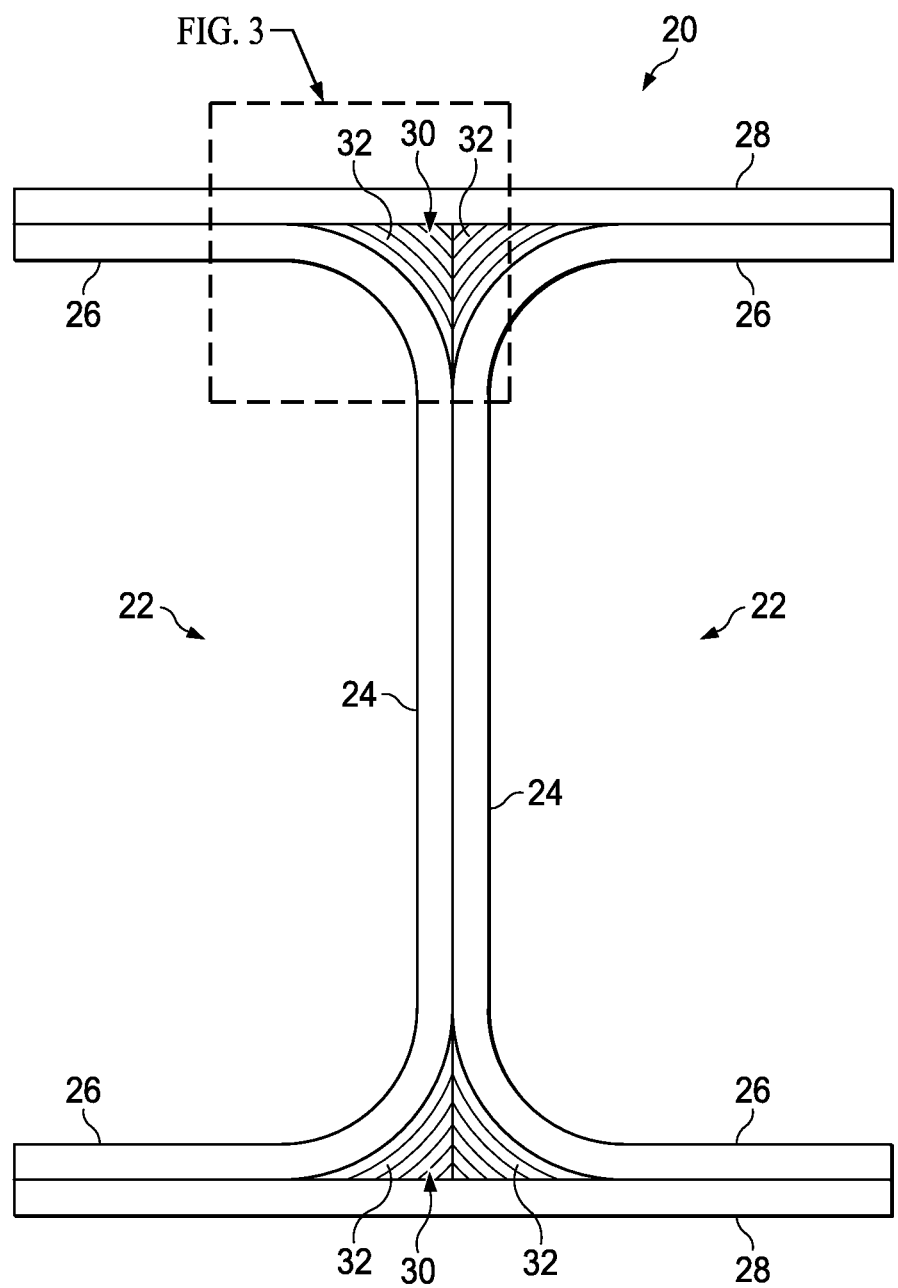
FIG. 2 is an illustration of an end view of the stiffener shown in FIG. 1, slightly exploded to show the individual stiffener parts.
Figure 3:
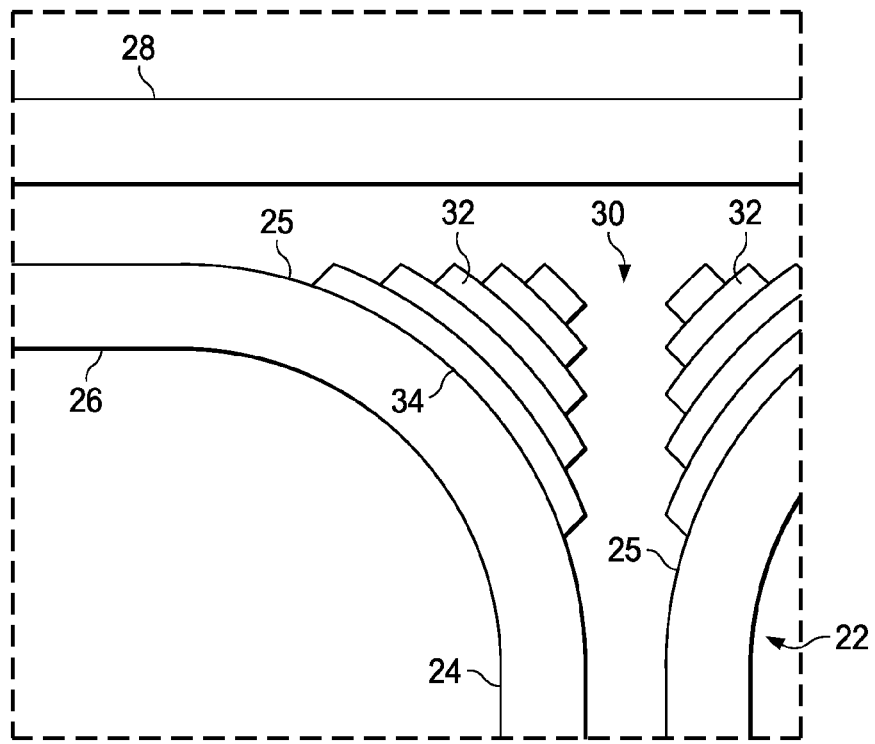
FIG. 3 is an illustration of the area designated as FIG. 3 in FIG. 2.

Referring now to FIGS. 2 and 3, the voids 30 are prefilled when the C-shaped parts 22 are laid up by forming integral filler details 32, sometimes also referred to herein as integrated fillers 32 or filler details 32. Plies forming the integral filler details 32 are laid up along with the plies forming the parts 22, however in some embodiments, the integral filler details 32 may be laid up on the parts 22 after the parts 22 are formed to shape. The parts 22, including integral filler details 32, may be precured in those applications where the parts 22 are assembled using adhesive bonding. Pre-curing of the parts 22 fixes the location of the filler details 32, eliminating the need for locating and fit up of the filler details 32 when the parts 22 are assembled. In this exemplary embodiment, the integrated fillers 32 are generally triangular in cross-sectional shape and are formed integral with the radiused edges 25. Each of the two voids 30 is substantially entirely be filled by two of the integrated fillers 32 which extend outwardly from a pair of the radius edges 25 into the volume of the void 30. Each of the two integrated fillers 32 is formed by multiple composite pies and fills at least a portion of the void 30. The cross-sectional shape of the integrated fillers 32 will depend on the application, and both the volume and shape of the void 30 required to be filled. In some applications, the integrated fillers 32 may completely fill the void 30, while in other applications, radius fillers 32 may reduce the volume of the void 30 and may be supplemented by a separate filler that is smaller in size then would be normally required to fill the entire volume of the void 30.

Figure 4:
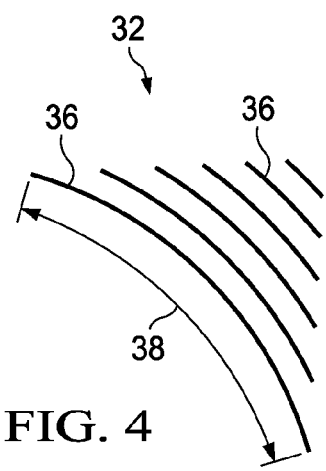
FIG. 4 is an illustration of an end view of an integrated filler, exploded to show the individual filler plies.
Figure 5:
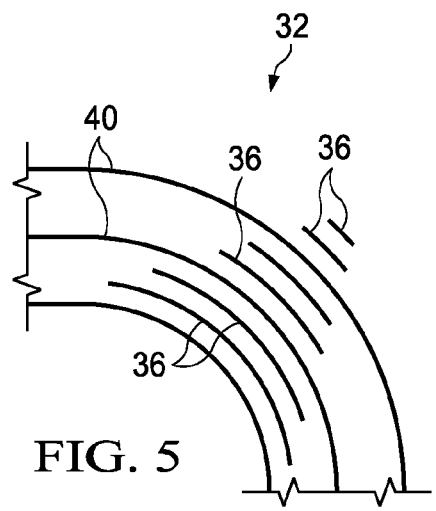
FIG. 5 is an illustration of an end view of an integrated filler exploded to reveal interspersed full and partial plies.
Figure 6:
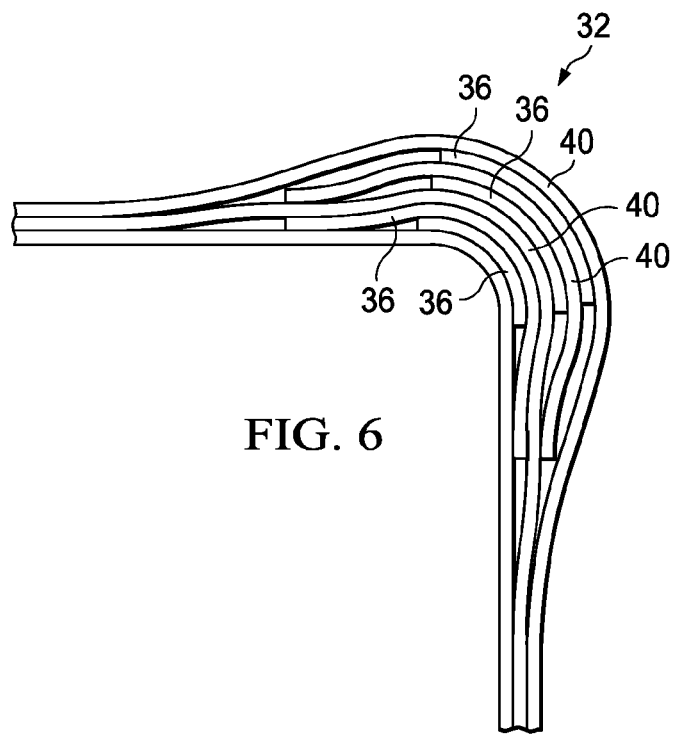
FIG. 6 is an illustration of an end view of an integrated filler before compaction, illustrating the ply buildup forming an integrated radius filler.

Referring now to FIGS. 3 and 4, the integrated filler 32a comprises, in one embodiment, a plurality of partial plies 36 that are laid up over the underlying outer full plies 34 (FIG. 3) forming the radius edge 25. The partial plies 36 may have progressively shorter arc lengths 38 in order to form the generally triangular cross-sectional integrated filler shape shown in FIGS. 2 and 3. In other embodiments, as shown in FIG. 5, the integrated filler 32 may comprise a combination of interleaved partial plies 36 and full plies 40. The use of full plies 40 may provide the stiffener 20 with additional strength and rigidity, and serve to support and stabilize the partial plies 36. The number of partial plies 36 and full plies 40 required to produce a particular integrated filler 32 will vary with the application. Referring to FIG. 6, the partial plies 36 build-up and add volume to the radius edge 25, while the full plies 40 cover and conform to the volumetric buildup provided by the partial plies 36.

Figure 7:
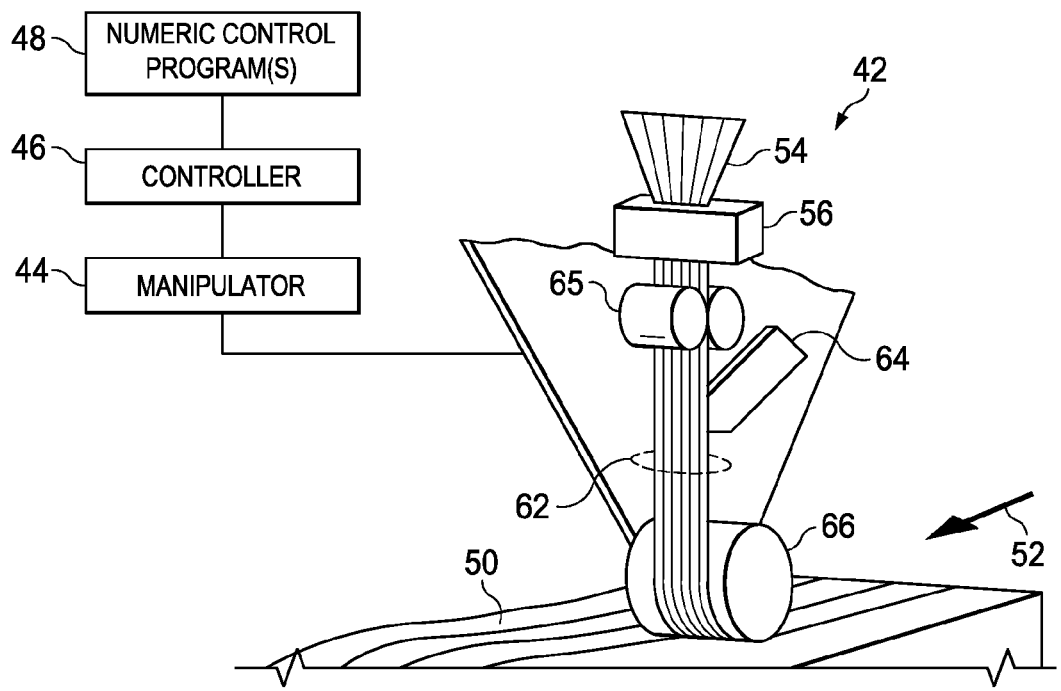
FIG. 7 is an illustration of a combined block and diagrammatic view showing the components of an automatic fiber placement system used to produce the integrated fillers.

Each of the partial and full plies 36, 40 of integrated filler 32 may be laid up using an automatic fiber placement (AFP) machine. For example, the components of one known AFP machine are broadly shown in FIG. 7. A fiber applicator head 42 may be mounted on a manipulator 44 which is controlled by a controller 46 operated by one or more numeric control programs 48. The controller 46 may comprise a general purpose computer or a programmable logic controller (PLC). The controller 46 and the manipulator 44 move applicator head 42 over a substrate 50 in a desired direction 52 to lay down multiple courses of tows 54 arranged in bandwidths 62 forming partial plies 36 or full plies 40 with a desired fiber orientation according to a ply schedule chosen for the application. Depending upon the application, multiple bandwidths 62 may be required to form a partial ply 36 having a desired arc length 38, however depending upon the application, as little as a single one of the tows 54 may be required to form one of the partial plies 36. The tows 54 are fed through a collimator 56 which aligns the tows 54 and draws them into the bandwidth 62. The bandwidth 62 of tows 54 is delivered through guide rollers 65 and is cut to a desired course length by one or more cutters 64. The bandwidth 62 is then applied to the substrate 50 and compacted by a roller 66.

Figure 8:
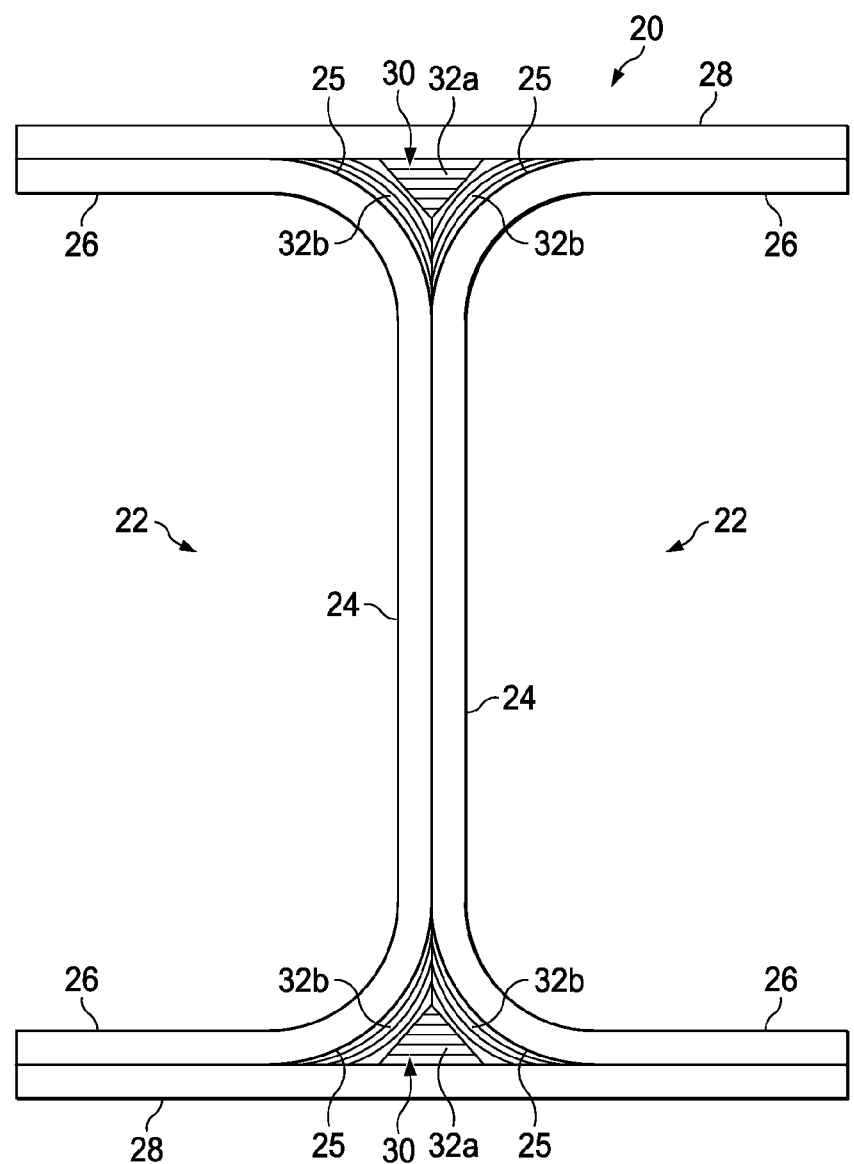
FIG. 8 is an illustration of an end view of an alternate stiffener having multiple integrated fillers of differing configurations.
Figure 9:
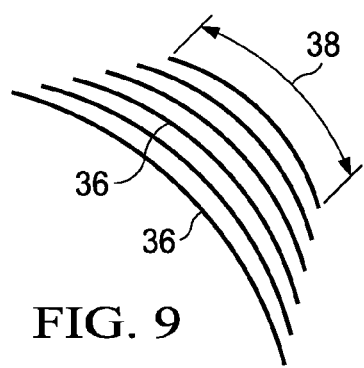
FIG. 9 is an end view of an embodiment of an integrated radius filler exploded to reveal individual filler plies.

FIG. 8 illustrates a composite laminate stiffener 20, in which the void 30 between the composite laminate parts 22, 28 is filled by three filler details 32a and 32b that are integrated into the parts 22, 28. The integrated filler 32a has a tapered shape in cross section and is formed integral with the full plies of the caps 28. In contrast, the integrated fillers 32b formed on the radius edges 25 of the C-shape parts 22, and each is generally arcuate in cross-sectional shape. In one embodiment, as shown in FIG. 9, the integrated fillers 32b are formed by a plurality of partial plies 36 each having an arc length 38 that substantially matches the arc length of the radius edges 25. In other embodiments, however, the partial plies 36 shown in FIG. 9 may be interspersed with full plies (not shown). The triangularly shaped integrated filler 32a and the pair of arcuately shaped integrated fillers 32b each fill a portion of the void 30, and together substantially fill the entire void 30 located at the intersections the of the radius edges 25 and caps 28.

Figure 10:
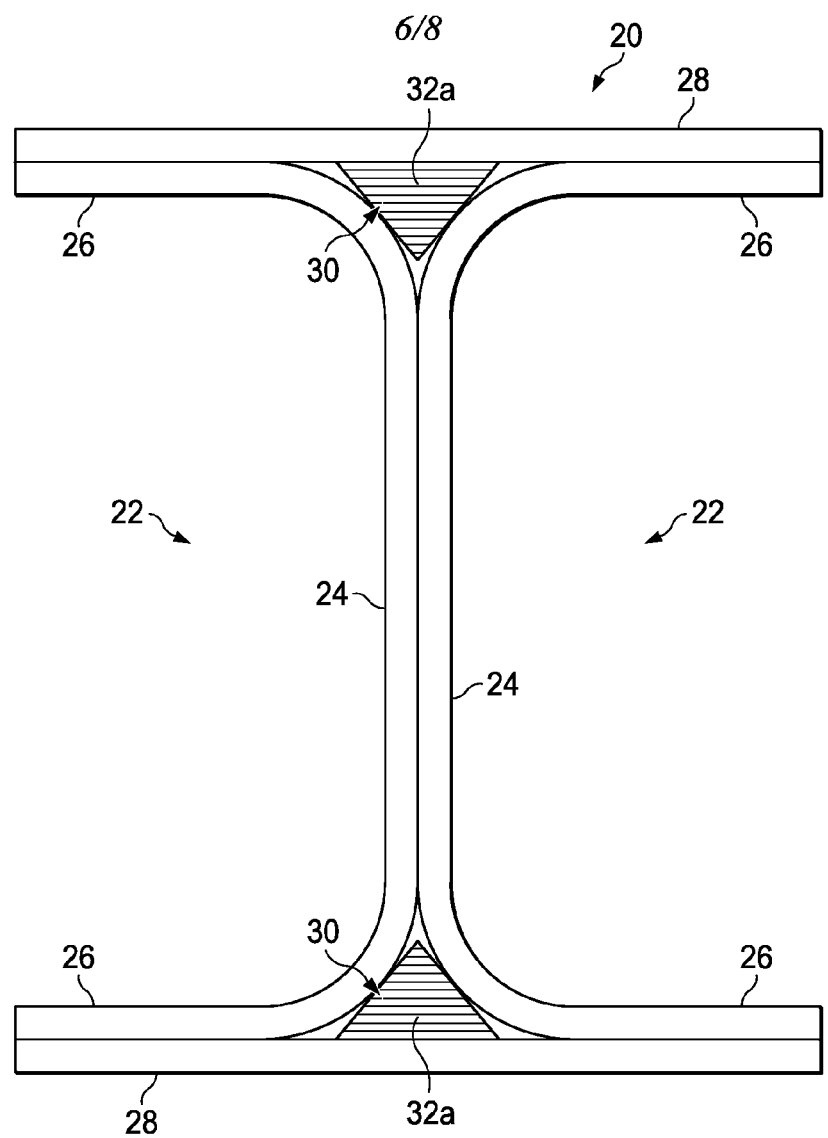
FIG. 10 is an illustration of an end view of another stiffener having integrated fillers forming an alternate embodiment.
Figure 11:
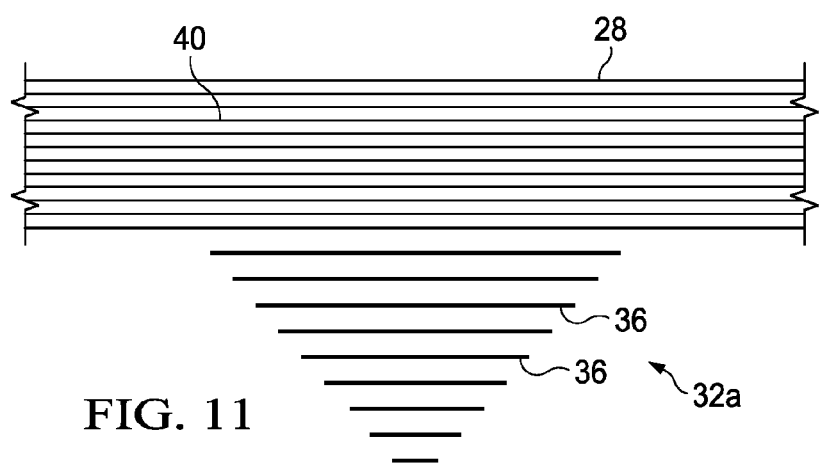
FIG. 11 is an illustration of a portion of one of the caps and a triangular filler forming part of the stiffener shown in FIG. 9, the integrated filler being exploded to show the individual filler plies.

FIG. 10 illustrates a stiffener 20 similar to the stiffener 20 shown in FIG. 1. In this embodiment, integrated fillers are laid up respectively on the caps 28 that have a substantially triangular shape with a base and an apex, and which substantially fill the entire volume of the voids 30. As shown in FIG. 11, each of the integrated fillers 32a comprises a plurality of partial plies 36 laid up on the full plies 40 of the caps 28, however as previously mentioned, any number of full plies may be interspersed with the partial plies 36 in order to reinforce and stabilize the integrated fillers 32a.

Figure 12:
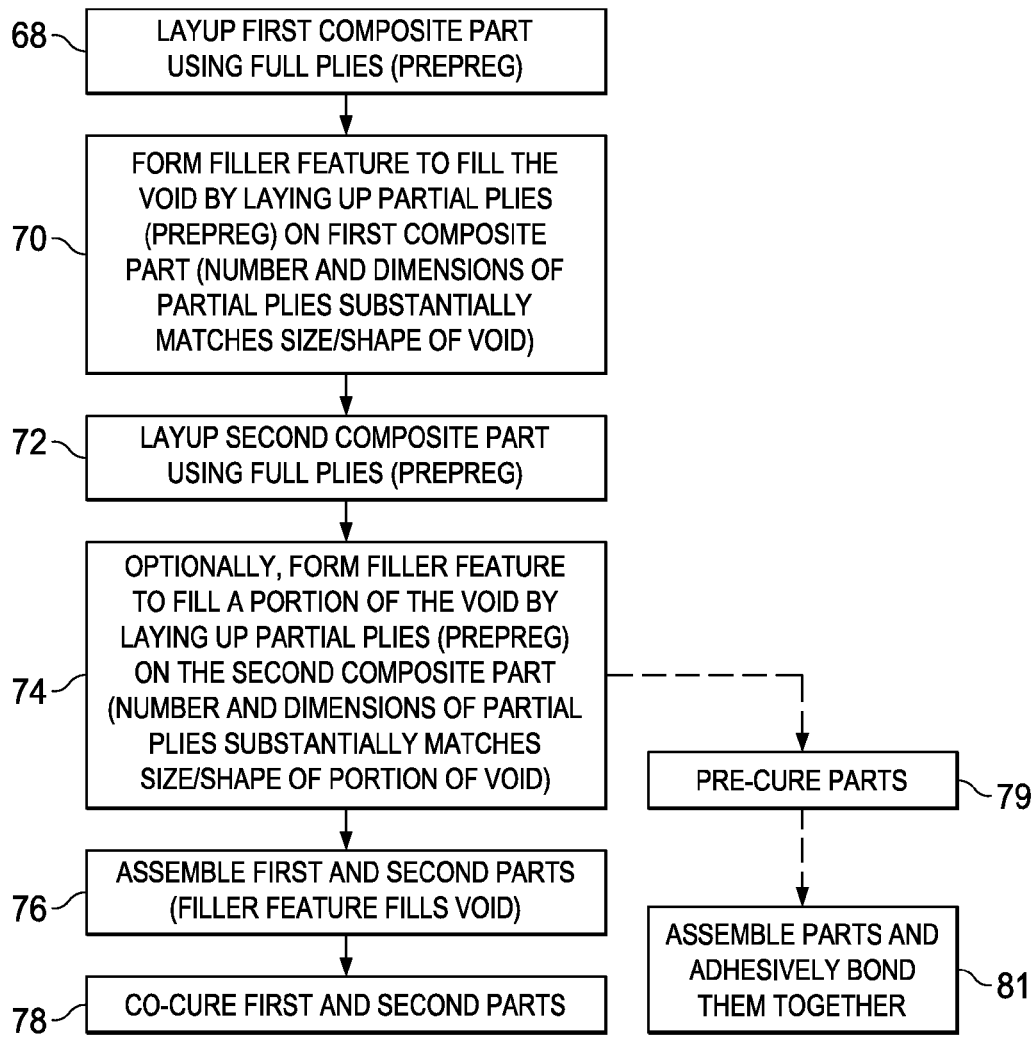
FIG. 12 is an illustration of a flow diagram of a method of producing a composite structure having an integrated filler.

FIG. 12 illustrates the overall steps of a method of fabricating a composite laminate structure 20 having multiple parts (e.g. 22, 28) intersecting to form a void 30 that may be filled in order to strengthen the structure 20. At 68, a first composite part (e.g. 22) is laid up using full plies 40 of prepreg. At 70, a filler feature or integrated filler 32 is formed that fills the volume of the void 30, by laying up partial plies 36 of prepreg on the first composite part 22. The number and dimensions of partial plies 36, along with full plies 40, substantially matches the size and shape of the void 30. At 72, a second composite part (22 or 28) is laid up using full plies 40 of prepreg. At 74, optionally, an integrated filler or filler feature 32 is formed to fill a portion of the void 30 by laying up partial plies 36 of prepreg on the second composite part (22 or 28), which may include intervening full plies 40 interspersed with the partial plies 36. The number and dimensions of partial plies 36 in combination with the intervening full plies 40, substantially match the size and shape of a portion of the void 30. At 76, the first and second parts (22, 28) are assembled, and the filler features 32 substantially fill the void 30. At step 78, the first and second parts (22, 28) are co-cured. In an alternate embodiment, the first and second parts 22, 28 along with the integrated fillers 32 are each precured at 79, following which at 81 the precured parts 22, 28 are assembled and adhesively bonded together.

Figure 13:
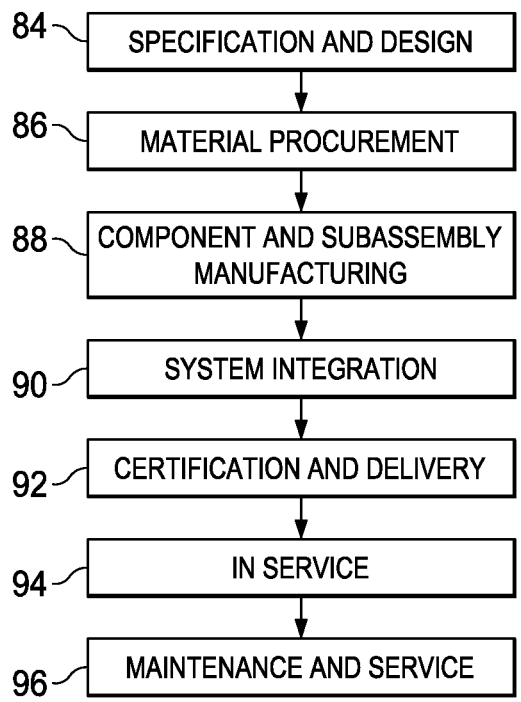
FIG. 13 is an illustration of a flow diagram of aircraft production and service methodology.
Figure 14:
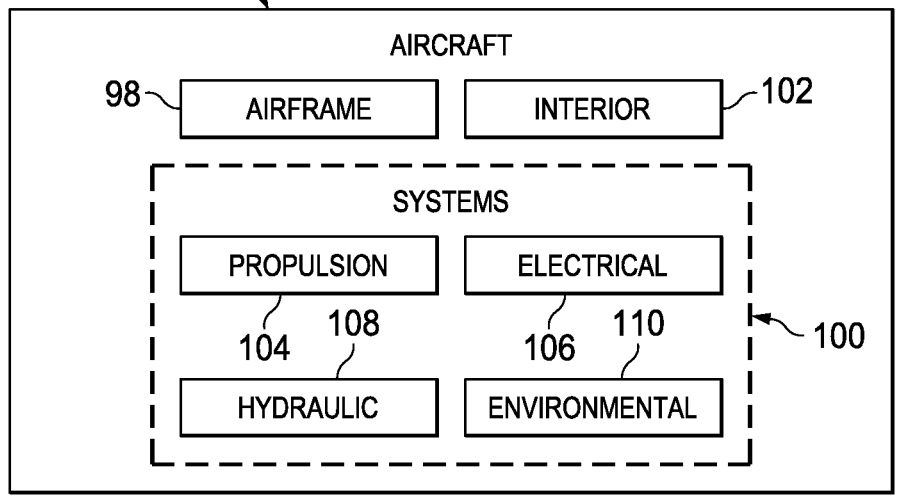
FIG. 14 is an illustration of a block diagram of an aircraft.

Embodiments of the disclosure may find use in a variety of potential applications, particularly in the transportation industry, including for example, aerospace, marine, automotive applications and other application where structural composite laminate assemblies, such as stringers, spars and beams, may be used. Thus, referring now to FIGS. 13 and 14, embodiments of the disclosure may be used in the context of an aircraft manufacturing and service method 80 as shown in FIG. 13 and an aircraft 82 as shown in FIG. 14. Aircraft applications of the disclosed embodiments may include, for example, without limitation, composite laminate stringers, spars and beams, to name only a few. During pre-production, exemplary method 80 may include specification and design 84 of the aircraft 82 and material procurement 86. During production, component and subassembly manufacturing 88 and system integration 90 of the aircraft 82 takes place. Thereafter, the aircraft 82 may go through certification and delivery 92 in order to be placed in service 94. While in service by a customer, the aircraft 82 is scheduled for routine maintenance and service 96, which may also include modification, reconfiguration, refurbishment, and so on.

Each of the processes of method 80 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 82 produced by exemplary method 80 may include an airframe 98 with a plurality of systems 100 and an interior 102. Examples of high-level systems 100 include one or more of a propulsion system 104, an electrical system 106, a hydraulic system 108 and an environmental system 110. Any number of other systems may be included. Although an aerospace example is shown, the principles of the disclosure may be applied to other industries, such as the marine and automotive industries.

Systems and methods embodied herein may be employed during any one or more of the stages of the production and service method 80. For example, components or subassemblies corresponding to production process 126 may be fabricated or manufactured in a manner similar to components or subassemblies produced while the aircraft 120 is in service. Also, one or more apparatus embodiments, method embodiments, or a combination thereof may be utilized during the production stages 88 and 90, for example, by substantially expediting assembly of or reducing the cost of an aircraft 82. Similarly, one or more of apparatus embodiments, method embodiments, or a combination thereof may be utilized while the aircraft 82 is in service, for example and without limitation, to maintenance and service 96.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of filling a void in a composite structure between a first radius edge of a first part, a second radius edge of a second part and a third part, the method comprising:
   laying up a first plurality of partial plies and a first plurality of full plies only on the first radius edge of the first part and laying up a second plurality of partial plies and a second plurality of full plies only on the second radius edge of the second part, wherein laying up the first plurality of partial plies and the first plurality of full plies are alternated such that the first plurality of partial plies are interspersed between the first plurality of full plies, and wherein laying up the second plurality of partial plies and the second plurality of full plies are alternated such that the second plurality of partial plies are interspersed between the second plurality of full plies; and
   joining the first part having the first plurality of partial plies and the first plurality of full plies, the second part having the second plurality of partial plies and the second plurality of full plies, and the third part to form the composite structure with the void substantially filled.

2. The method of claim 1, wherein laying up the first plurality of partial plies and the second plurality of partial plies is performed using an automatic fiber placement machine.

3. The method of claim 1, wherein the first plurality of partial plies and the second plurality of partial plies are sized and shaped to form a tapered shape partially filling the void.

4. The method of claim 1, further comprising:
determining a size and a shape of the void, and
determining a number and dimensions of the first plurality of partial plies and the second plurality of partial plies required to partially fill the void.

5. The method of claim 4, wherein the shape is generally triangular.

6. The method of claim 5, wherein the shape includes a base extending along the composite structure.

7. The method of claim 6, wherein the shape includes an apex extending into the void.

8. The method of claim 4, wherein the shape is substantially triangular and includes a base extending along the composite structure and an apex extending into the void.

9. The method of claim 1, further comprising:
mounting a fiber applicator head on a manipulator.

10. The method of claim 9, further comprising:
controlling the manipulator by a computer operated by one or more numeric control programs to move the fiber applicator head.

11. A method of fabricating a composite laminate structure, the method comprising:
laying up a first plurality of full plies and a first plurality of partial plies only on a first radius edge of a first part and laying up a second plurality of full plies and a second plurality of partial plies only on a second radius edge of a second part; and
joining the first part, the second part and a third part to form the composite laminate structure, wherein the first plurality of full plies, the first plurality of partial plies, the second plurality of full plies, and the second plurality of partial plies substantially fill a void between the first radius edge, the second radius edge, and the third part; and
wherein laying up the first plurality of full plies and the second plurality of full plies further comprises: interspersing the first plurality of partial plies with the first plurality of full plies and interspersing the second plurality of partial plies with the second plurality of full plies.

12. The method of claim 11, wherein laying up the first plurality of partial plies and the second plurality of partial plies is performed using an automatic fiber placement machine.

13. The method of claim 11, further comprising:
determining a size and a shape of the void, and
determining the size and number of the first plurality of partial plies and the second plurality of partial plies required to partially fill the void.

14. The method of claim 13, wherein the shape is generally triangular.

15. The method of claim 14, wherein the shape includes a base extending along the composite laminate structure.

16. The method of claim 15, wherein the shape includes an apex.

17. The method of claim 16, wherein the apex extends into the void.

18. The method of claim 13, wherein the shape is substantially triangular and includes a base extending along the composite laminate structure and an apex extending into the void.

19. The method of claim 12, further comprising:
mounting a fiber applicator head on a manipulator.

20. The method of claim 19, further comprising:
controlling the manipulator by a computer operated by one or more numeric control programs to move the fiber applicator head.

* * * * *